United States Patent [19]

Onoda et al.

[11] Patent Number: 4,548,084
[45] Date of Patent: Oct. 22, 1985

[54] FLOW METER

[75] Inventors: Hajime Onoda, Tokyo; Kunio Arakawa, Urawa, both of Japan

[73] Assignee: Kimmon Manufacturing Co., Inc., Tokyo, Japan

[21] Appl. No.: 466,446

[22] Filed: Feb. 15, 1983

[30] Foreign Application Priority Data

Aug. 11, 1982 [JP] Japan ................. 57-138409
Aug. 11, 1982 [JP] Japan ................. 57-120974

[51] Int. Cl.[4] .................. G01F 1/075; G01F 1/08
[52] U.S. Cl. .................. 73/861.81; 73/861.87
[58] Field of Search .......... 73/861.33, 861.79, 861.81, 73/861.82, 861.87, 861.88, 202

[56] References Cited

U.S. PATENT DOCUMENTS

| 314,480 | 3/1885 | Rosenkranz et al. | 73/861.88 |
| 1,355,165 | 10/1920 | Rasch | 73/861.79 X |
| 3,949,606 | 4/1976 | Blancett | 73/861.87 |

FOREIGN PATENT DOCUMENTS

| 0968185 | 5/1975 | Canada | 73/202 |
| 0052705 | 2/1937 | Denmark | 73/861.81 |
| 0044963 | 3/1980 | Japan | 73/861.87 |
| 0201684 | 9/1967 | U.S.S.R. | 73/861.79 |

Primary Examiner—Charles A. Ruehl
Attorney, Agent, or Firm—Nilsson, Robbins, Dalgarn, Berliner, Carson & Wurst

[57] ABSTRACT

In a flow meter, a cylindrical member containing therein a vane wheel is fitted in a measuring chamber of a casing so as to be closely in contact with the peripheral wall of the casing, and a cover is put on the cylindrical member. Rectangular inlet and outlet nozzles in a side wall portion of the cylindrical member communicate with inlet and outlet ports of the casing, respectively. A pivot supporting the vane wheel is replaceably attached to a bottom portion of the cylindrical member. A supporting shaft of the vane wheel extends upward through a center opening in the cover to be connected to a measuring mechanism.

9 Claims, 16 Drawing Figures

FIG. 1

PRIOR ART

FIG. 2

PRIOR ART

FIG. 3

PRIOR ART

FLOW METER

BACKGROUND OF THE INVENTION

This invention relates to a flow meter for measuring the rate or quantity of flow of tap water as a fluid flowing through a casing.

Flow meters of this type have a casing which is provided with inlet and outlet ports and a measuring chamber containing therein a vane wheel. A fluid introduced into the measuring chamber through the inlet port rotates the vane wheel, and the number of rotations is measured by a measuring mechanism disposed over the measuring chamber. Then, an indicator section including a counter visually indicates the measured quantity of flow or consumption. In this case, nozzles with a fixed cross-sectional flow area are generally formed aslant in the wall of the measuring chamber so as to correspond to the inlet and outlet ports, in order to cause the fluid positively to act on the vane wheel, thereby minimizing the instrumental error or the discrepancy between the flow quantity and its corresponding measured number of rotations of the vane wheel.

Figure 1:
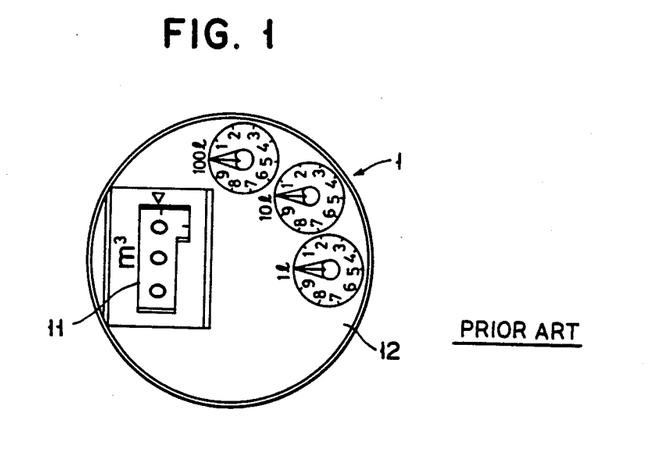
FIG. 1 is a plan view of an indicator section of a prior art flow meter.
Figure 2:
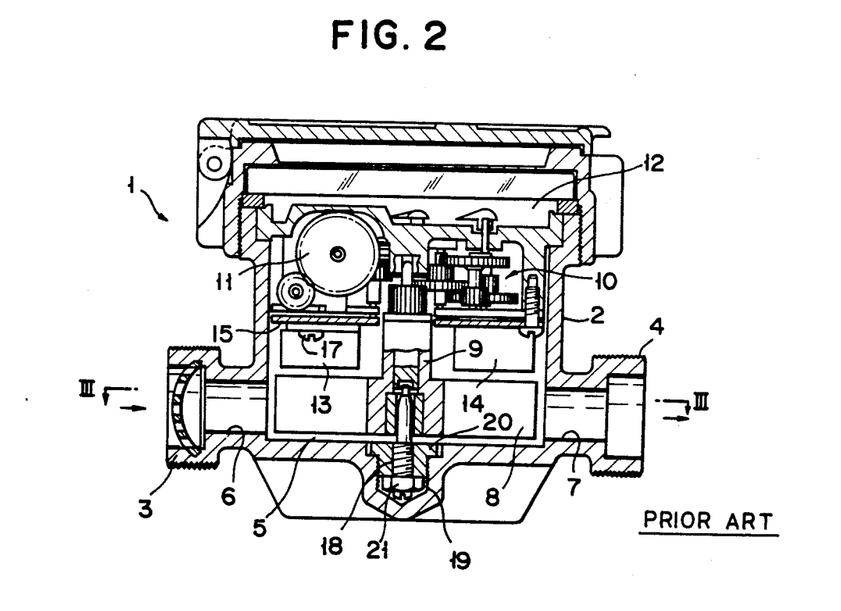
FIG. 2 is a longitudinal sectional view of the prior art flow meter.
Figure 3:
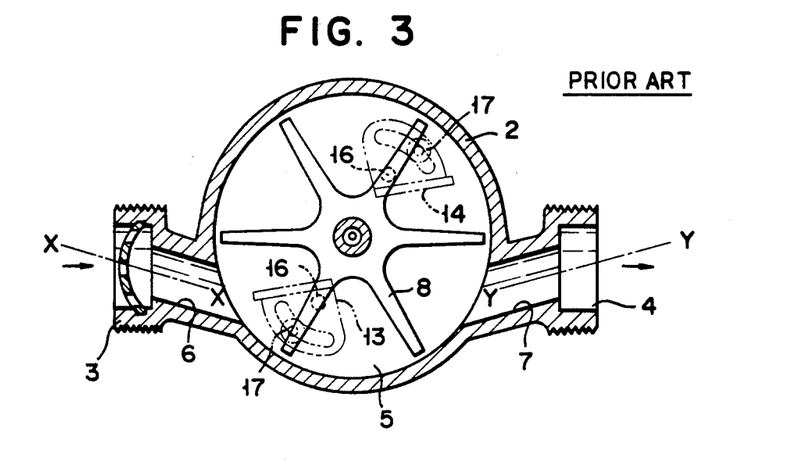
FIG. 3 is a cross-sectional view taken along line III—III of FIG. 2.

In a prior art flow meter 1 shown in FIGS. 1 to 3, an inlet nozzle 6 and an outlet nozzle 7 open into a measuring chamber 5 so as to correspond to an inlet port 3 and an outlet port 4 of a casing 2 of the meter 1. The inlet and outlet nozzles 6 and 7 extend aslant along axes X—X and Y—Y (FIG. 3), respectively, and tangential to the rotating direction of a vane wheel 8. A fluid or tap water to be measured is led into a measuring chamber 5 through the inlet nozzle 6 to rotate the vane wheel 8. The rotation of the vane wheel 8 is transmitted through its supporting shaft 9 to a measuring mechanism 10 formed of a number of gears. The measurement result is visually indicated by an indicator section 12 (FIG. 1) including a counter 11.

In the conventional meter of this type, instrumental errors are adjusted by a pair of adjusting plates 13 and 14 having the vane wheel 8 in the measuring chamber 5. The adjusting plates 13 and 14 are intended to adjust the so-called forward flow. In adjustment, the adjusting plates 13 and 14 are moved symmetrically. Each of the adjusting plates 13 and 14 can rock around its shaft 16, and can also be fixed to a fixed supporting plate 15 in a suitable angular position by retaining means 17 formed of a setscrew and a slot. Thus, the action of the fluid on the vane wheel 8 may be controlled by changing the angular positions of the adjusting plates 13 and 14 to adjust the resistance against the incoming fluid.

The vane wheel 8 is rotatably supported by a pivot 18 fixed to the casing 2. The pivot 18 is fixed upright in the center of the measuring chamber 5 by means of a supporting member 20 screwed in a tapped hole 19 in the bottom of the measuring chamber 8 and a nut 21 fitted on the lower end portion of the pivot 18.

The casing of the meter of this type is generally formed by casting a metal such as bronze, and the nozzles are formed by machining afterwards. However, the nozzles must be accurately worked in a slanting manner, as shown in FIG. 3, requiring hard and complicated machine work.

With use of the adjusting plates of the prior art meter, instrumental error adjustment for the forward flow side may exert an influence on adjustment for the counter flow side, and it is difficult to make proper, well-balanced adjustment for both flow directions. This is an inevitable situation so long as the flow resistance is controlled for adjustment. Usually, therefore, a method is adopted in which the instrumental errors on the forward flow side are minimized at the sacrifice, in some measure, of the adjustment for the counter flow side.

The use of the adjusting plates widens the inside space of the measuring chamber, constituting a hindrance to the miniaturization of the meter as a whole.

Moreover, the manner of pivot fitting requires a tapped hole in the casing and troublesome assembly work for fitting the pivot in the tapped hole. Since the fitting portion of the pivot is complicated in structure, replacement of the pivot once set in place requires troublesome work, such as removal of the supporting member from the tapped hole. Thus, the construction and operation of the meter need be simplified or facilitated.

SUMMARY OF THE INVENTION

Accordingly, the object of this invention is to provide a flow meter of a compact design, enjoying facilitated parts assembly, improved measuring performance, and easy pivot replacement, without requiring the troublesome, high-accuracy machine work as is required by the casing of the prior art meter.

In order to attain the above object, a flow meter according to this invention is so constructed that an integral bottomed cylindrical member of synthetic resin including a side wall portion and a bottom portion is fitted in a measuring chamber so as to be closely in contact with the peripheral wall of the measuring chamber. Inlet and outlet nozzles are formed in the side wall portion of the cylindrical member so as to take the form of penetrating holes corresponding to inlet and outlet ports, respectively, when the bottomed cylindrical member is fitted in the measuring chamber. A cover of synthetic resin is put on the bottomed cylindrical member, and a pivot rotatably supporting a vane wheel is provided in the center of the bottom portion of the cylindrical member. A supporting shaft of the vane wheel extends upward through an opening in the center of the cover to be connected to a measuring mechanism located above the cover.

Thus, the nozzles and the fitting portions of the pivot are all formed in the bottomed cylindrical member, so that the casing does not require any accurate machine work. Moreover, the bottomed cylindrical member can readily be formed from synthetic resin. Since the measuring chamber is distinctly defined by the bottomed cylindrical member and the cover, the fluid can act on the vane wheel with high efficiency. A plurality of ribs radially arranged around the pivot are formed integrally on the respective inner surfaces of the bottom portion of the cylindrical member and the cover. Thus, the efficiency of the action of the fluid on the vane wheel can be improved further.

In this invention, moreover, the pivot rotatably supporting the vane wheel in the center of the bottom portion of the bottomed cylindrical member is removably fitted in the cylindrical member to be supported thereby.

Accordingly, the casing does not require any fitting portion for the pivot, and can be manufactured with improved facility. The pivot can readily be replaced by removing it from the bottom portion of the bottomed cylindrical member which is taken out of the measuring chamber as it is.

The individual portions of the pivot, including a portion to support the fit with the bottom portion of the cylindrical member, may be formed integrally. Alternatively, a tip bearing portion, a shank portion, and a support portion may be formed from separate materials and then combined together.

Also, an extended head formed at the support portion may be fitted in a spot facing groove formed in the bottom portion of the bottomed cylindrical member so as to be securely held between the bottom portion of the cylindrical member and the bottom surface of the casing. The head and the spot facing groove may function as locking means for the pivot if they are made rectangular.

The flow meter according to this invention basically comprises a bottomed cylindrical member and a cover, and further comprises as instrumental error adjusting means, instead of using the prior art adjusting plates, narrow penetrating holes near the inlet and outlet nozzles and means attached to the bottomed cylindrical member for adjusting the opening areas of the penetrating holes. Thus, the flow rate of an adjusting flow passing through the penetrating holes are controlled for instrumental error adjustment. In this case, the flow rate is adjusted instead of adjusting the flow resistance, so that individual adjustments for forward and counter flows may be less affected by each other, and can be performed with higher accuracy.

DETAILED DESCRIPTION OF THE PREFERRED EMBODIMENT

There will now be described in detail an embodiment of this invention with reference to the accompanying drawings.

Figure 4:
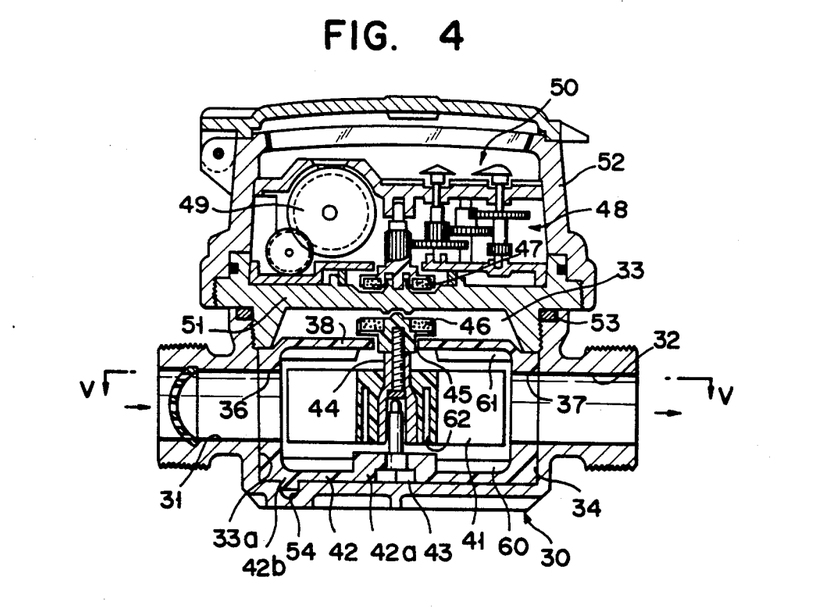
FIG. 4 is a longitudinal sectional view of a flow meter according to an embodiment of this invention.
Figure 6:
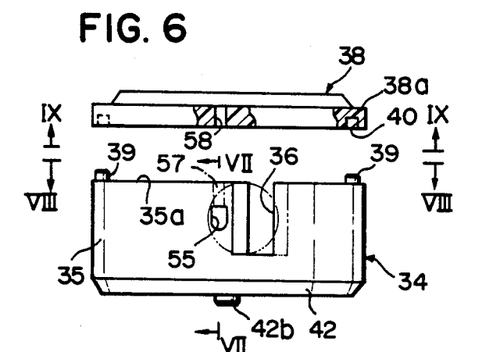
FIG. 6 is a partially cutaway disassembled view taken along line VI—VI of FIG. 5 showing a bottomed cylindrical member and a cover.
Figure 7:
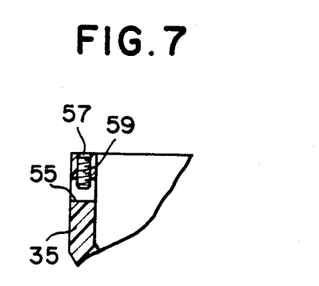
FIG. 7 is a partially cutaway view taken along line VII—VII of FIG. 6.

In a flow meter according to the embodiment of the invention shown in FIG. 4, a measuring chamber 33 with a cylindrical peripheral wall 33a is defined between an inlet port 31 and an outlet port 32 formed in a casing 30. An integral bottomed cylindrical member 34 formed of synthetic resin is detachably fitted in the chamber 33 so as to be closely in contact with the peripheral wall 33a. As seen from FIG. 6, the cylindrical member 34 is provided with U-shaped inlet and outlet nozzles 36 and 37 which are formed in a top edge 35a of a side wall portion 35 so as to correspond to the inlet and outlet ports 31 and 32, respectively. A cover 38 is put on the cylindrical member 34, positioned through the engagement between projections 39 integral with the top edge 35a of the cylindrical member 34 and indentations 40 in a peripheral flange portion 38a of the cover 38. When the cover 38 is on the cylindrical member 34, the nozzles 36 and 37 are each in the form of a rectangular penetrating hole.

Inside the cylindrical member 34, a vane wheel 41 with six rectangular vanes 41a is rotatably supported by a pivot 43 which is mounted on a center boss 42a of a bottom portion 42 of the cylindrical member 34. A supporting shaft 44 of the vane wheel 41 extends upward through an opening in the center of the cover 38, and is fitted with a driving-side magnet coupling 46 at the top portion. A driven-side magnet coupling 47 is connected to a measuring mechanism 48 so as to correspond to the magnet coupling 46. The measuring mechanism 48 is connected to an indicator section 50 including a counter 49. The indicator section 50 visually indicates measurement results in the same manner as the counterpart in the prior art meter shown in FIGS. 1 to 3.

In the flow meter of this invention, the rotation of the vane wheel 41 is transmitted to the measuring mechanism 48 by means of the magnet coupling 47, and the measuring chamber side of the casing 30 under the measuring mechanism 48 is isolated from the space surrounding the measuring mechanism 48 by a partition frame 51. Therefore, a fluid in the measuring chamber 33 will never penetrate the space around the measuring mechanism 48. Thus, this meter is what is called a dry flow meter. It is to be understood, however, that this invention may also be applied to the so-called wet flow meter shown in FIG. 2 in which the shaft of the vane wheel is connected directly to the measuring mechanism. Accordingly, this portion of the meter constitutes none of the features or essential points of the invention.

A meter section 52 including the partition frame 51 is screwed into the casing 30 in a liquid-tight manner through the medium of a seal 53, and can be removed from the casing 30 by unscrewing. After the meter section 52 is removed, the cover 38 and the bottom cylindrical member 34 can be detached.

A positioning projection 42b is formed integrally on the outside of the bottom portion 42 of the cylindrical member 34, and an indentation 54 is formed in the bottom wall of the casing 30 so as to correspond to the projection 42b. The fitting position of the bottomed cylindrical member 34 relative to the casing 30 is determined by fitting the projection 42b in the indentation 54, as shown in FIG. 4. The indentation 54 can be formed in the bottom wall of the casing 30 by simple machine work.

Figure 5:
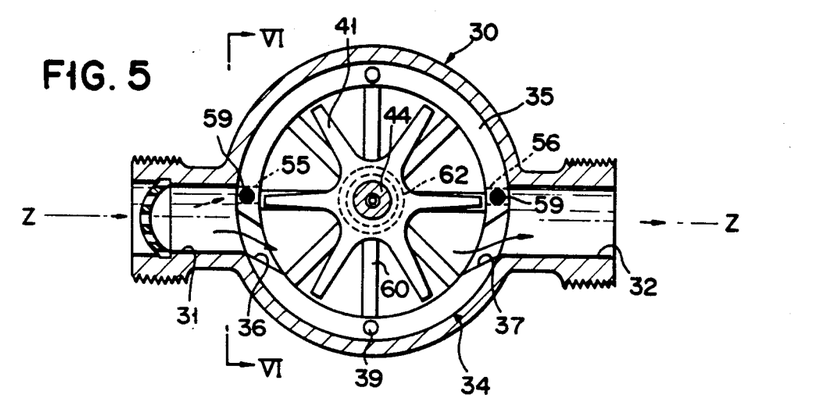
FIG. 5 is a cross-sectional view taken along line V—V of FIG. 4.

As shown in FIG. 5, the inlet and outlet nozzles 36 and 37 are formed aslant in the side wall portion 35 of the bottomed cylindrical member 34 so as to extend tangentially to the rotating direction of the vane wheel 41. The passages of the nozzles 36 and 37 are long enough to allow the fluid to flow along their slanting courses. For example, an effective nozzle length of 7 mm (measured along the central axis of each nozzle) may be secured if the side wall portion 35 is 5 mm thick.

Since the nozzles are thus formed in the cylindrical member 34, the inlet and outlet ports 31 and 32 of the casing 30 require no specially accurate machine work. Moreover, the ports 31 and 32 may be arranged in a simple straight line along an axis Z—Z, as shown in FIG. 5, so that the casing 30 may be formed more easily than in the case of the prior art construction shown in FIG. 3. The peripheral wall 33a of the measuring chamber 33 requires no accurate machine work, either.

Figure 10:
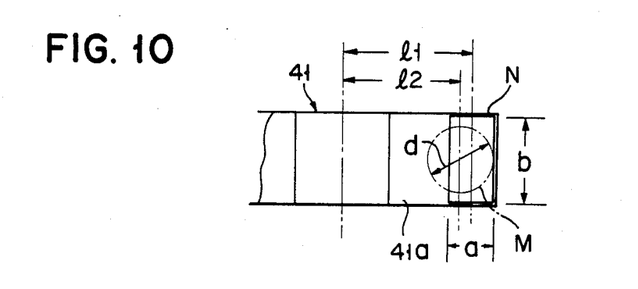
FIG. 10 is a diagram for illustrating the positional relationships between a vane wheel and nozzles.

The rectangular nozzles 36 and 37 are preferable to the conventional circular nozzles for the following reason. Here let it be supposed that the width and height of a rectangular nozzle N represented by a full line in FIG. 10 are a and b, respectively, the diameter of a prior art circular nozzle M represented by a broken line is d, one end portions (outer end portions) of the openings of the two nozzles are in alignment with the extreme end portion of the vane 41a of the vane wheel 41, and the cross-sectional flow areas of the nozzles are equal. In this case, if the rectangular nozzle N is so elongate that its height b is approximate to the width of the vane 41a, the distance $l_1$ from the cross-sectional center of the rectangular nozzle N to the center of rotation of the vane wheel can be made longer than the distance $l_2$ from the cross-sectional center of the circular nozzle M to the rotation center of the vane wheel. The point of action of the fluid flowing through the rectangular nozzle N is located at the position corresponding to the distance $l_1$, while that of the fluid flowing through the circular nozzle M is located at the position corresponding to the distance $l_2$. On account of the difference between the distances $l_1$ and $l_2$, therefore, the torque on the vanes in the rectangular nozzle N is greater than that in the circular nozzle M.

Thus, if the cross-sectional flow area is fixed, the fluid can act on the vanes more efficiently in the rectangular nozzle N than in the circular nozzle M. Accordingly, if a given torque is applied to the vanes, the rectangular nozzle can be used with shorter vanes for the same effect than those vanes which are required for the circular nozzle. Thus, the vanes can be reduced in size.

In this embodiment, penetrating holes 55 and 56 are formed in the side wall portion 35 of the bottomed cylindrical member 34 in the vicinities of the nozzles 36 and 37, respectively. The cross-sectional area of each of the penetrating holes 55 and 56 is about 20% of that of each nozzle. The penetrating holes 55 and 56 also correspond to the inlet and outlet ports 31 and 32, respectively. The penetrating holes 55 and 56 are each provided with a tapped hole 57 vertically extending from the top edge 35a of the side wall portion 35 of the bottomed cylindrical member 34. Round holes 58 are formed in the flange portion 38a of the cover 38 put on the cylindrical member 34, individually corresponding to the tapped holes 57. Adjust screws 59 as restricting means are movably screwed into opening regions of the penetrating holes 55 and 56 through the individual tapped holes 57.

The penetrating hole 55 corresponding to the inlet port 31, in conjunction with its corresponding screw 59, functions are a forward flow adjuster for instrumental error adjustment of the so-called forward flow, while the other penetrating hole 56 corresponding to the outlet port 32, in conjunction with its corresponding screw 59, functions as a counter flow adjuster for instrumental error adjustment of the so-called counter flow.

Where the fluid flows in the forward direction, as shown in FIG. 5, the main stream of the fluid introduced through the inlet port 31 enters the measuring chamber 33 through the inlet nozzle 36 as indicated by a full-line arrow to rotate the vane wheel 41. At the same time, a by-pass stream penetrates the measuring chamber 33 through the penetrating hole 55 as indicated by a broken-line arrow to control the rotation of the vane wheel 41, thereby adjusting the instrumental errors of the forward flow. Where a counter flow is produced, on the other hand, the fluid flows from the outlet port 32 into the measuring chamber 33 through the outlet nozzle 37 to rotate the vane wheel 41 reversely. In this case, the by-pass stream enters the measuring chamber 33 through the penetrating hole 56 to control the reverse rotation of the vane wheel 41, thereby adjusting the instrumental errors of the counter flow. The counter flow may be produced, for example, when a large quantity of fluid is consumed through some piping systems connected to the side of the inlet portion 31 while the fluid consuming side, i.e., a tap, connected to the outlet port 32 is off or closed.

The quantity of fluid flowing through the penetrating holes 55 and 56 for adjustment can readily be changed by suitably adjusting the length of projection of the screws 59 by means of a screwdriver or the like. Here the instrumental error adjustment is based not on the method to control the flow resistance by the adjusting plates as shown in FIG. 3, but on the method to control the flow quantity by the by-pass stream. According to this method, forward-flow adjustment in one penetrating hole exerts less influence on counter-flow adjustment in the other. Since the adjusting mechanism can be attached to the bottomed cylindrical member, the number of parts used in the meter can be reduced for simpler construction and for the economy of space, and also the adjusting capability can be improved further. In particular, the instrumental error adjustment for counter flow, which has conventionally been a problem, can be performed satisfactorily.

Figure 11:
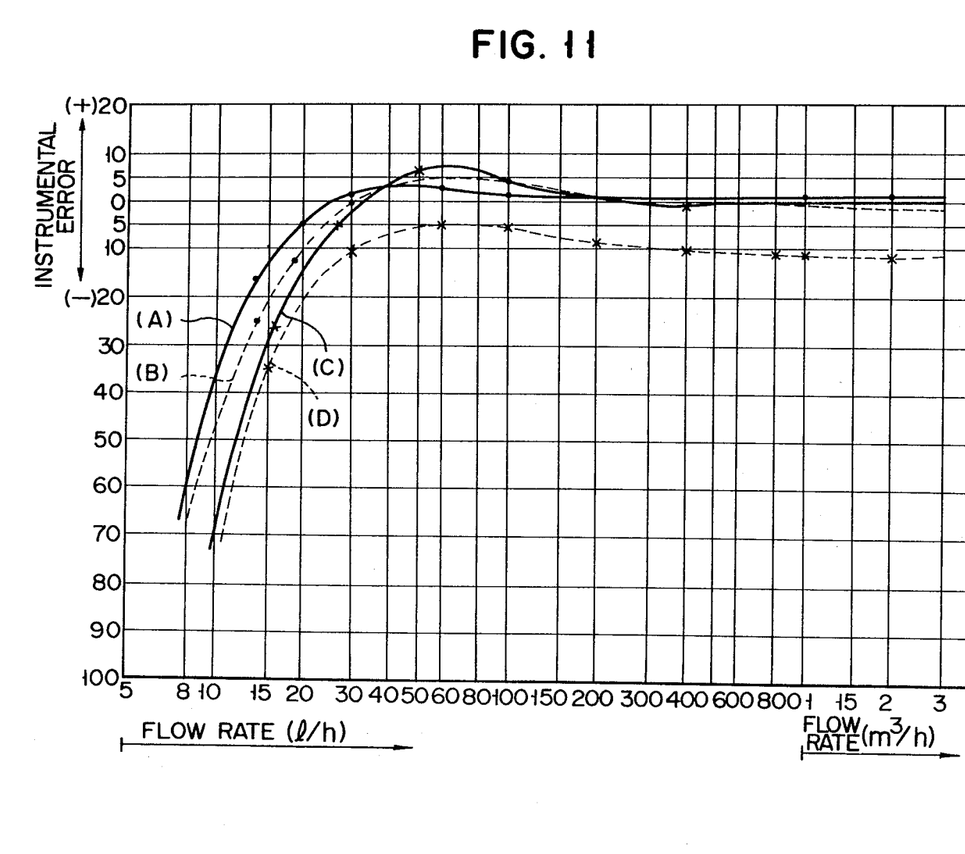
FIG. 11 shows instrumental error curves of the flow meter of the invention compared with those of the prior art flow meter for illustrating the relationship between instrumental errors and flow quantity.

Among the instrumental error curves shown in FIG. 11, curves (A) and (B) represent instrumental errors for forward and counter flows, respectively, for this embodiment, and curves (C) and (D) represent those for the prior art meter as compared with the change of flow rate. The rate of fluid consumption or flow rate normally ranges from 30 l/h to 1.5 m$^3$/h with use of a nominal diameter of 13 mm. In the case of the prior art meter, as seen from FIG. 11, the instrumental error for counter flow is as great as approximately −10% throughout the substantially whole range of low rate if the meter is so adjusted as to minimize the instrumental error for forward flow. In this case, the instrumental error will not be improved any more.

In the case of this embodiment, as seen from FIG. 11, the instrumental error for counter flow can greatly be improved, and the instrumental error curve for counter flow resembles that for forward flow.

As regards the instrumental error curves for forward flow, moreover, curve (A) for this embodiment is more stable in linearity than curve (C) for the prior art meter. Curve (C) indicates a negative error in a range of 200 l/h to 600 l/h and a greater positive error than that indicated by curve (A) in a range of 40 l/h to 100 l/h. Thus, curve (C) lacks stability. The flow rate to produce an instrumental error of −5% is 20 l/h for curve (A) and 28 l/h for curve (C). Thus, the prior art meter is limited in the range of flow rate responsive to the allowable instrumental error range of ±5%.

According to this embodiment, the combination of the unique adjusting mechanism and the rectangular nozzles provides high measuring performance which cannot be obtained with use of the circular nozzles and the adjusting plates of the prior art meter.

Figure 8:
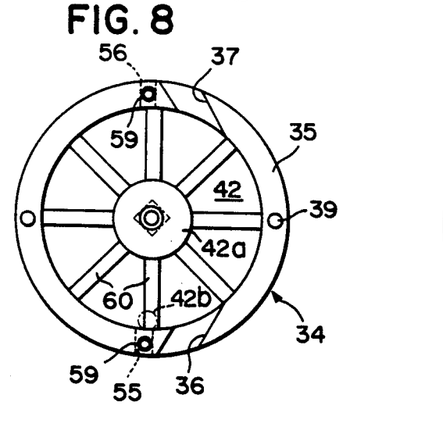
FIG. 8 is a plan view of the bottomed cylindrical member taken along line VIII—VIII of FIG. 6.
Figure 9:
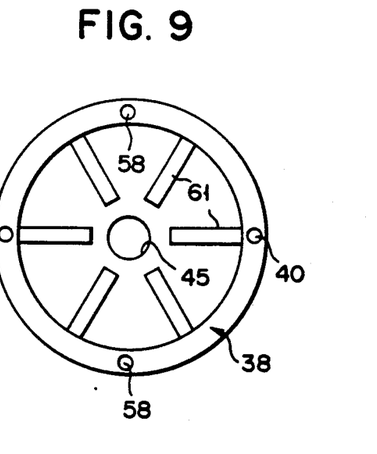
FIG. 9 is a bottom view of the cover taken along line IX—IX of FIG. 6.

In this embodiment, moreover, a plurality of ribs 60 and 61 are formed integrally on the respective inner surfaces of the bottom portion 42 of the bottomed cylindrical member 34 and the cover 38, as expressly shown in FIGS. 8 and 9. The ribs 60 and 61 are radially arranged around the center of rotation of the vane wheel 41 so as to fill up the narrow spaces left over and under the vane wheel 41 in the cylindrical member 34, as shown in FIG. 4. The ribs 60 and 61 give resistance to those flows of fluid which escape to the spaces over and under the vane wheel 41 after entering the measuring chamber 33, thereby positively directing the flows toward the vane wheel 41. Thus, the fluid can more efficiently apply turning effort to the vane wheel.

An experiment indicated that it is advisable to provide eight ribs 60 under the vane wheel 41 for higher resistance and six ribs 61 over the vane wheel 41 if the vane wheel 41 has six vanes.

Since the pivot 43 is attached to the boss 42a in the center of the bottom portion 42 of the bottomed cylindrical member 34, it is unnecessary to machine the casing 30 for fitting work.

A deep annular groove 62 is formed in the under surface of a center boss portion retaining the supporting shaft 44 of the vane wheel 41. Thus, the vane wheel 41 is reduced in weight.

Figure 12:
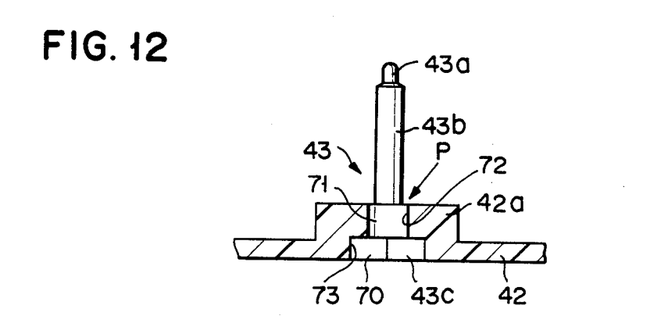
FIG. 12 is an enlarged view of a pivot bearing portion of the flow meter shown in FIG. 4.
Figure 13:
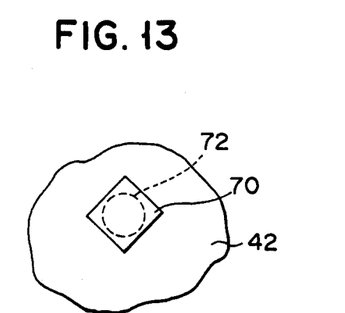
FIG. 13 is a bottom view of the portion shown in FIG. 12.

As shown in the enlarged view of FIG. 12, the pivot 43 is formed of a tip bearing portion 43a directly supporting the vane wheel 41, a shank portion 43b, and a support portion 43c fitted in the boss 42a in the center of the bottom portion 42 of the bottomed cylindrical member 34 to be supported thereby. The support portion 43c is provided with an extended head 70 forming an end portion of the pivot 43 and a large-diameter shank portion 71 continuous with the head 70. Thus, the pivot 43 can be attached to and detached from the boss 42a through the underside of the bottom portion 42 of the cylindrical member 34. Formed in the boss 42a are a shaft hole 72 penetrating the boss 42a and a rectangular spot facing groove 73 surrounding the shaft hole 72, corresponding to the shape of the support portion 43c. When the pivot 43 is attached to the boss 42a, therefore, the rectangular head 70 is fitted in the groove 73 to prevent the pivot 43 from rotating unexpectedly. Thus, the pivot is positioned with respect to its rotating direction.

In the state that the cylindrical member 34 is fitted in the casing 30, the support portion 43c of the pivot 43 is held between the bottom portion 42 of the cylindrical member 34 and the bottom surface of the casing 30, so that the support portion 43c may securely be retained in the boss 42a. Therefore, if the cylindrical member 34 is so designed that its bottom portion 42 is brought in contact with the bottom surface of the casing 30, the large-diameter shank portion 71 is fitted tightly in the shaft hole 72, so that the fit of the support portion 43c may be somewhat loose.

The support portion 43c may readily be removed from the boss 42a without damaging the same by tapping a suitable tool against the top of the large-diameter shank portion 71 as indicated by arrow P in FIG. 12.

Figure 14:
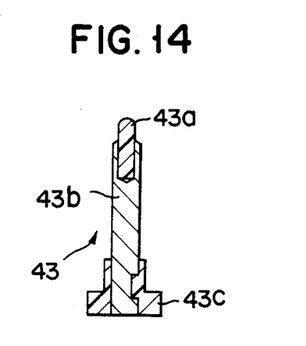
FIG. 14 is a longitudinal sectional view of a pivot shown in FIG. 12.

The pivot 43 may be integrally formed from metal or wear-resistant synthetic resin. Alternatively, it is possible to form the tip bearing portion 43a, the shank portion 43b, and the support portion 43c from ebonite or wear-resistant synthetic resin, from stainless steel or phosphor bronze, and from synthetic resin, respectively, so that the tip bearing portion 43a is pressed into the shank portion 43b, and that the support portion 43c is formed integrally on the shank portion 43b, as shown in FIG. 14. According to this construction, materials best suited to the functions of the individual parts of the pivot 43 can be selected.

Thus, the pivot is removably attached to the bottomed cylindrical member of synthetic resin fitted in the casing. Accordingly, the pivot can be replaced with ease, and the casing requires no machine work for attachment of the pivot thereto.

Figure 15:
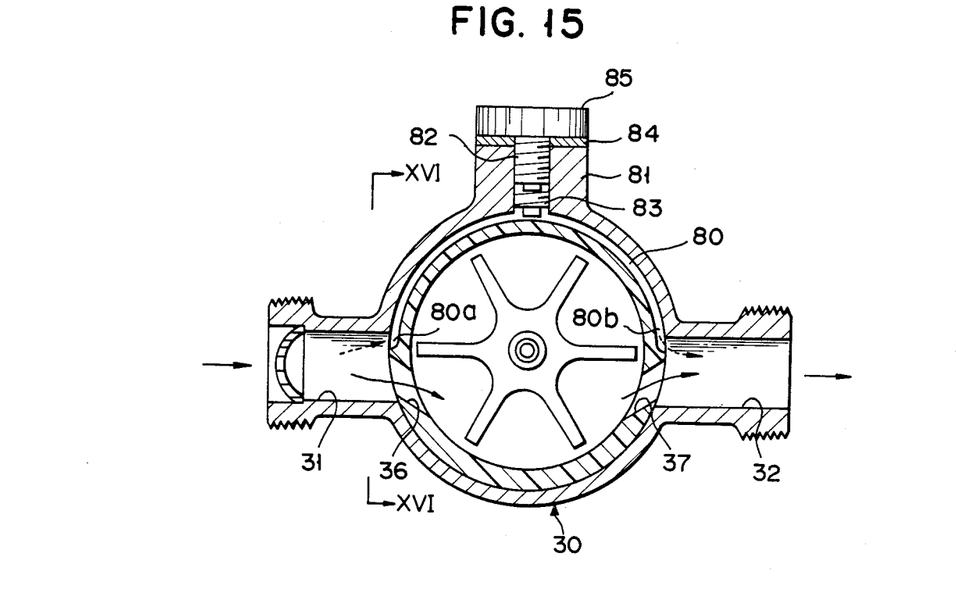
FIG. 15 is a cross-sectional view similar to FIG. 5 showing a modification of an adjusting section of the flow meter of the invention.
Figure 16:
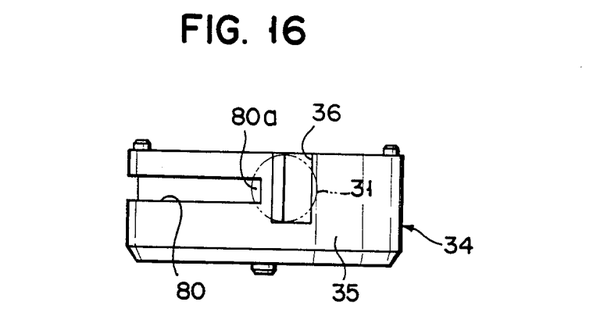
FIG. 16 is a side view of the bottomed cylindrical member taken along line XVI—XVI of FIG. 15.

FIGS. 15 and 16 show a modification of the instrumental error adjusting mechanism. In this case, a circumferential groove 80 is formed in the outer peripheral surface of the side wall portion 35 of the bottomed cylindrical member 34 to cover nearly half the circumference of the side wall portion 35. One end 80a of the groove 80 extends close to the inlet nozzle 36 to correspond to the inlet port 31, while the other end extends close to the outlet nozzle 37 to correspond to the outlet port 32. The casing 30 is provided with an outwardly projecting boss portion 81. An adjust screw 83 is movably screwed into a tapped hole 82 of the boss portion 81 so that the tip of the screw 83 extends into the groove 80. A cap screw 85 is fitted on the adjust screw 83 in a liquid-tight manner with the aid of a gasket 84.

Although the greater part of the fluid led into the inlet port 31 flows into the inlet nozzle 36, the remaining part as an adjusting flow enters the groove 80 and then escapes directly to the outlet port 32. Accordingly, the flow rate of the adjusting flow can be adjusted by manually controlling the length of projection of the adjust screw 83 in the groove 80. Thus, the rate or quantity of fluid flow entering the measuring chamber through the inlet nozzle 36 may be changed for instrumental error adjustment.

The advantage of this modification lies in that the instrumental errors can be adjusted directly by external manual operation without removing the meter section.

What we claim is:

1. A flow meter with a casing having an inlet port, an outlet port, and a measuring chamber containing therein a vane wheel, comprising:
an integral bottomed cylindrical member of synthetic resin including a bottom portion and a side wall portion which is fitted in said measuring chamber so as to be closely in contact with the peripheral wall of said measuring chamber and has an inlet nozzle and an outlet nozzle corresponding to said inlet and outlet ports, respectively;
a cover of synthetic resin put on said cylindrical member;

a pivot rotatably supporting said vane wheel, said pivot being set in the center of the bottom portion of said bottomed cylindrical member;

a supporting shaft of said vane wheel connected to a measuring mechanism over said measuring chamber through an opening in the center of said cover; and penetrating holes for instrumental error adjustment formed in the side wall portion of said bottomed cylindrical member in the vicinity of said inlet and outlet nozzles so as to correspond to the inlet and outlet ports of said casing, respectively, the cross-sectional flow area of each said penetrating hole being restricted to a proper value by manually adjustable restricting means.

2. The flow meter according to claim 1, wherein a plurality of ribs radially extending from said pivot are formed integrally on the inner surface of the bottom portion of said bottomed cylindrical member, and a plurality of ribs arranged around said opening are formed integrally on the inner surface of said cover.

3. The flow meter according to claim 1, wherein said restricting means is formed of screws screwed into the side wall portion of said bottomed cylindrical member so that one end of each said screw can project into each corresponding one of said penetrating holes.

4. The flow meter according to claim 1, wherein inlet and outlet nozzles are rectangular, and the upper end of each said nozzle is opened at a top edge of the side wall portion of said bottomed cylindrical member.

5. The flow meter according to claim 1, wherein said bottomed cylindrical member is positioned by fitting a projection formed integrally on the outer surface of the bottom portion of said bottomed cylindrical member in an indentation formed in said casing so as to correspond to said projection.

6. A flow meter with a casing having an inlet port, an outlet port, and a measuring chamber containing therein a vane wheel, comprising:

an integral bottomed cylindrical member of synthetic resin including a bottom portion and a side wall portion which is fitted in said measuring chamber so as to be closely in contact with the peripheral wall of said measuring chamber and has an inlet nozzle and an outlet nozzle corresponding to said inlet and outlet ports, respectively;

a cover of synthetic resin put on said cylindrical member;

a pivot rotatably supporting said vane wheel, said pivot being set in the center of the bottom portion of said bottomed cylindrical member;

a supporting shaft of said vane wheel connected to a measuring mechanism over said measuring chamber through an opening in the center of said cover;

a circumferential groove formed in the outer peripheral surface of the side wall portion of said bottomed cylindrical member so that one and the other ends of said groove communicate with said inlet and outlet ports, respectively; and manually adjustable restricting means for restricting the cross-sectional flow area of said groove to a proper value.

7. The flow meter according to claim 6, wherein said restricting means is formed of a screw screwed into said casing so that one end of said screw can project into said groove.

8. A flow meter with a casing having an inlet port, an outlet port, and a measuring chamber containing therein a vane wheel, comprising:

an integral bottomed cylindrical member of synthetic resin including a bottom portion and a side wall portion which is fitted in said measuring chamber so as to be closely in contact with the peripheral wall of said measuring chamber and has an inlet nozzle and an outlet nozzle corresponding to said inlet and outlet ports, respectively; and a pivot rotatably supporting said vane wheel, said pivot including a tip bearing portion, a shank portion, and a support portion fitted in the center of the bottom portion of said bottomed cylindrical member so as to be supported thereby, said support portion having an extended head, and said pivot being inserted from the outside of the bottom portion of said bottomed cylindrical member into a shaft hole penetrating the center of said bottom portion so that said head is fitted in a spot facing groove around said shaft hole.

9. The flow meter according to claim 8, wherein said head and said spot facing groove corresponding thereto are rectangular.

* * * * *

UNITED STATES PATENT AND TRADEMARK OFFICE
CERTIFICATE OF CORRECTION

PATENT NO. : 4,548,084
DATED : October 22, 1985
INVENTOR(S) : Hajime Onoda, et al It is certified that error appears in the above-identified patent and that said Letters Patent is hereby corrected as shown below:

On the title page:
The name of the assignee should read:

-- Kimmon Manufacturing Co., Ltd. --

Basic Japanese application No. 57/120974 should read:

-- 57/120974[U] --

Signed and Sealed this

Tenth Day of March, 1987

Attest:

DONALD J. QUIGG

Attesting Officer

Commissioner of Patents and Trademarks